HIGH SPEED BONDING APPARATUS

Filed Feb. 12, 1968 4 Sheets-Sheet 1

Dec. 23, 1969 R. F. MORRONE 3,486,004

HIGH SPEED BONDING APPARATUS

Filed Feb. 12, 1968 4 Sheets-Sheet 3

3,486,004

HIGH SPEED BONDING APPARATUS

Ross F. Morrone, Trenton, N.J., assignor to Time Research Laboratories, Inc., Pennington, N.J., a corporation of New Jersey Filed Feb. 12, 1968, Ser. No. 704,673
Int. Cl. F27d *11/00;* H05b *3/02, 1/00*
U.S. Cl. 219—385 4 Claims

ABSTRACT OF THE DISCLOSURE

A pair of focused radiant energy heat sources in combination with carrier means to mount a part to be heated and providing for simultaneously carrying out heating, loading and unloading operations.

The invention relates to improvements in apparatus for joining or bonding materials by melting at least one of the materials or melting a bonding agent therebetween and then allowing the same to solidify to effect joinder and in particular, the invention relates to improvements in such equipment which adapt the same to high speed operation.

The invention is especially useful as a means to produce heat for the melt-type bonding of parts in miniature and sub-miniature electronic components where the heat must be applied in extremely small areas and/or where physical contact between the part and the heat source is undesirable or virtually impossible yet where high production rates are essential.

In one aspect the invention contemplates a radiant energy heat source which will concentrate the energy within a relatively small zone in combination with simplified rapidly operating, compact equipment for holding the heat source and the part to be heated in desired juxta-position.

In another aspect the invention contemplates a pair of radiant energy heat sources in combination with equipment which provides for one of the heat sources to be heating a part while a previously heated part is removed and a new part inserted.

In the preferred form the heat source is a quartz envelope tungsten filament lamp which emits energy in the infra-red band in combination with an elliptical reflector to desirably reflect the energy.

The invention finds a special utility in the integrated circuit field particularly in sealing the covers of ceramic and metal type flat packs and in bonding the leads of such flat packs to the contacts of circuit boards.

The invention will be described in connection with the above mentioned flat packs. However, it will be understood by those skilled in the art that the invention is highly useful in other areas; e.g., in sealing and melting plastics, in glass-to-metal seals such as hermetic and pressurized seals, in brazing single or multiple joints in annealing and hardening and in other applications requiring short term, high intensity, localized heating.

The equipment of the invention will be explained below in connection with the following drawings wherein.

Figure 1:
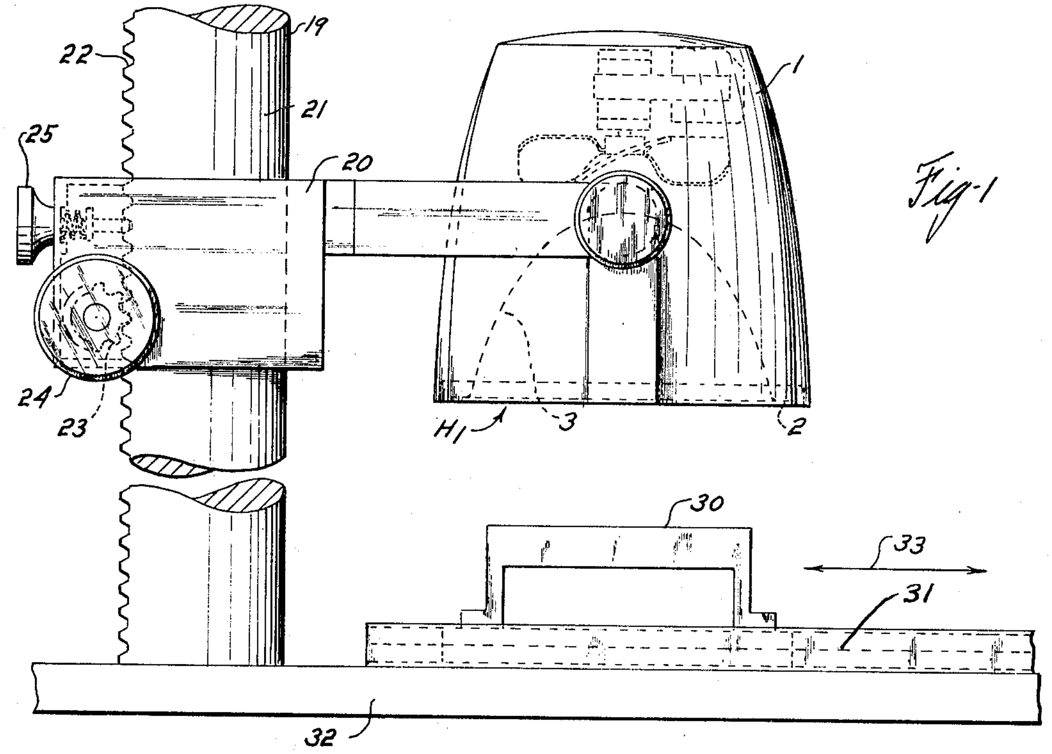
FIGURE 1 is a side elevational view showing equipment constructed in accordance with the invention.
Figure 2:
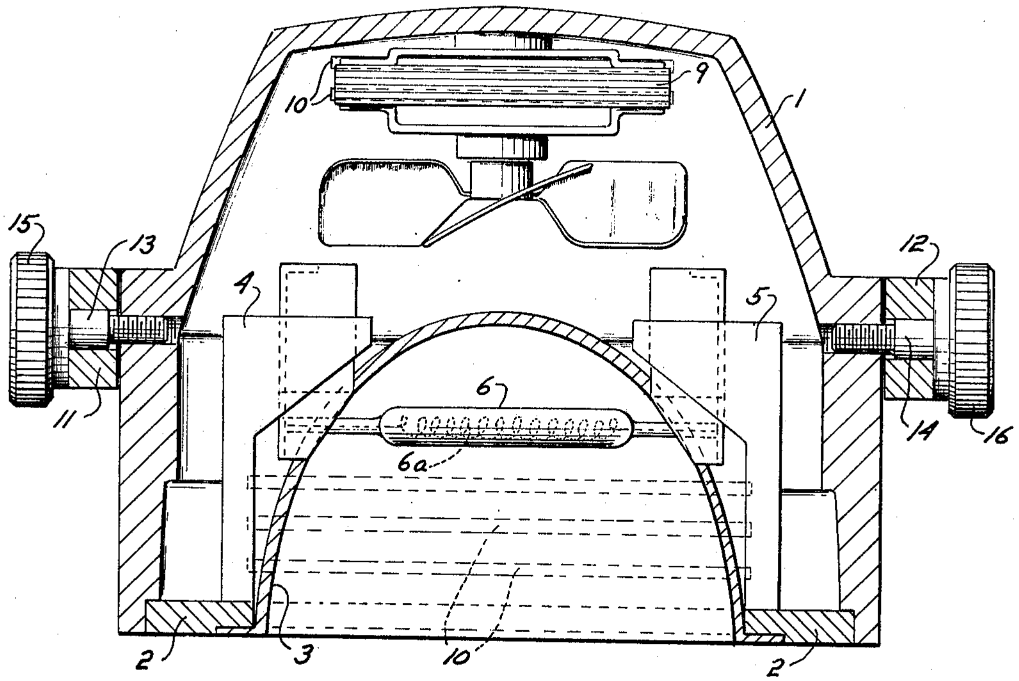
FIGURE 2 is a side elevational view partially in section showing the details of an infra-red heating source.

In FIGURES 1 and 2, I have illustrated radiant energy heat source together with means for mounting the same adjacent mechanism to support and locate the part to be heated.

The heat source H–1 comprises a hollow case 1 carrying a mouth-ring 2 which in turn supports an elliptical reflector 3 together with the support brackets 4 and 5 mounting a lamp 6. Inside of the reflector case is a fan assembly 9 which circulates air through the slots 10 in the case 1.

The lamp 6 is a quartz-iodine hot filament type. The lamp is mounted so that the filament 6*a* is located at one of the focal points of the reflector 3. The inside of the reflector is preferably gold plated and highly polished to maintain high reflection capabilities.

When power is applied to the filament 6*a*, radiant energy in the infra-red band is emitted and the reflector focuses the radiant energy into the desired object or area to be heated as will be described later.

The invention contemplates the heat source H–1 to be mounted on an elevating assembly 19 about a work supporting platen as described below.

The reflector case is disposed between a pair of arms 11 and 12 which respectively carry the pivots 13 and 14. The case can be tilted about the axis of the pivots and locked in position by turning up the screws 15 and 16.

The reflector case and arms are mounted on carriage 20 which provides for the case to be vertically adjustable. The carriage 20 is slidably mounted on a post 21 which carries a rack 22 cooperating with the pinion 23 rotatably mounted in the carriage 20. The handwheel 24 is used to manipulate the pinion. A spring loaded plunger 25 mounted in the carriage 20 cooperates with the ring 22 for locking the carriage into position.

The object to be heated is carried on a work table or platen 30 slidably mounted on the track 31 carried by the base 32. The platen 30 is movable in the direction shown by the arrows 33.

For loading a part to be heated the carriage is moved away from the heating source (to the right as viewed in FIGURE 1) and the part is loaded on the platen either by itself or on an appropriate fixture. For heating, the platen is then moved back under the lamp in position shown.

The portion of the part to be heated is located along the focal axis of the reflector and substantially in the plane of the other focal point. In setting up a job the reflector is adjusted so that the part, as it is placed on the platen, meets the foregoing condition.

In setting up a job, I found it expedient to adjust the reflector simply by measuring the space between the outer surface of the ring 2 and the top surface of the platen. Also, it is pointed out that teeth on the ring and pinion are made of a size commensurate with the degree of adjustment required by the parts to be heated. In other words, the teeth can be coarse or fine depending upon the nature of the work with which the equipment is used.

As indicated in FIGURE 2, the filament 6*a* of the lamp is elongated and therefore is not a true point source of energy. The effect of this is that the elliptical reflector focuses or concentrates the reflected energy in a somewhat donut-shaped pattern at the far focal plane.

With an elliptical reflector of approximately 4" diameter and a focal length of 1.770" the effective focal zone is approximately .374" in diameter. The size of the zone is a function of the filament size.

In FIGURES 3, 4, 5 and 6, I have illustrated equipment of the invention utilizing heat sources such as described above. The equipment is adapted for high production conditions in that a part can be heated while at the same time a part previously heated is unloaded from the equipment and a new part to be heated is loaded onto the equipment.

Figure 3:
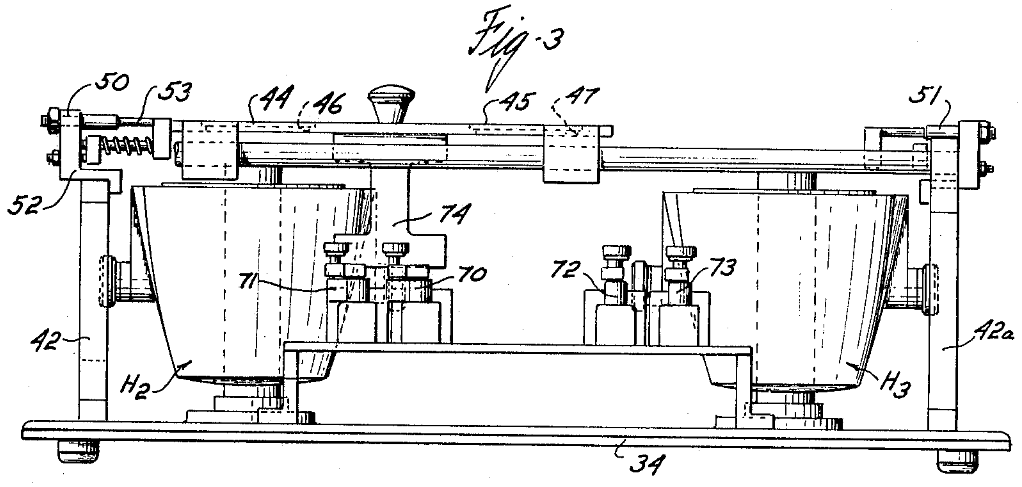
FIGURE 3 is a front elevational view of heating equipment constructed in accordance with the invention and especially adapted for high production sealing of flat pack covers.

In FIGURE 3, heat sources H–2 and H–3 are disposed on a base 34 so that the radiant energy from each is reflected in an upward direction. The heat sources are respectively mounted on the elevating assemblies 38 and 36 which are the same as the elevating assembly 19.

Disposed over the heat sources is a carrier support means comprising a pair of rods 40 and 41 respectively secured to end supports 42 and 42*a*. The rods slidably mount a carrier 43. The carrier is provided with stations 44 and 45 which preferably comprise quartz plates suitably supported over apertures 46 and 47 in the carrier. The apertures provide for the quartz plates to be exposed to radiant energy.

Quartz has been selected for the material of the stations 44 and 45 because quartz has the quality of passing infra-red energy without substantial attenuation.

Figure 4:
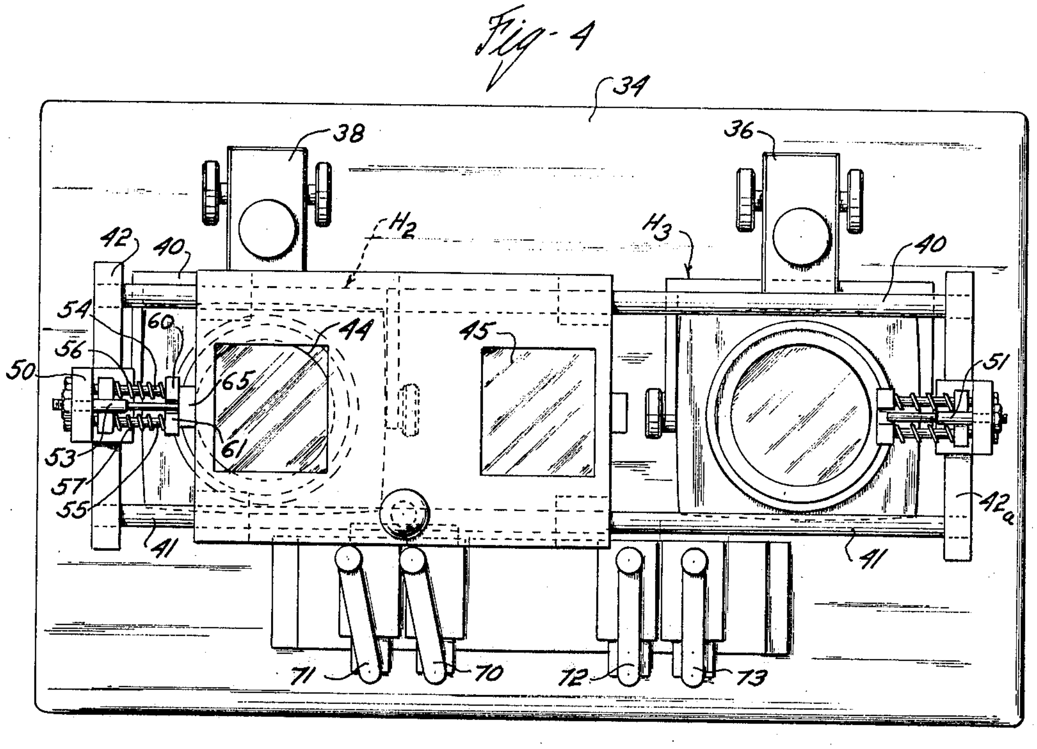
FIGURE 4 is a plan view of FIGURE 3.

In operation the carrier has two positions; the first of which is shown in FIGURES 3 and 4. In this position the station 44 receives radiant energy from the heat source H–2 while the station 45 is disposed between the heat sources and free from the radiant energy thereof. In this position a part on the station 44 can be heated while a part on the station 45 can be removed and another part to be subsequently heated placed on the station.

In the second position the carrier is moved to the right so that the station 45 is directly over the heat source H–3. The part that was loaded on the station 45 is then heated while the part on the station 44 is removed and a new part placed thereon. The carrier is then moved back to the first position wherein the heat source H–2 heats the new part while the part on the station 45 is removed. This process is continually repeated.

For supporting a part to be heated on the quartz plates 44 and 45 suitable fixtures or nests to accommodate the structure of the part are provided. Usually, the equipment of FIGURES 3 and 4 will be set up within an enclosure having a controlled atmosphere. The machine operator sits outside of the enclosure with the arms extending inside through suitable entry means so that the hands are free to pick up parts to be heated from the pile within the enclosure or to manipulate a handling device to pick up the parts and to place the same in position to be heated. Ordinarily, the pile of parts will be located behind the equipment so that the arms extend through the enclosure respectively on the left and right hand sides of equipment.

The first and second positions of the carriage 44 are defined by the cushioned magnetic stop assemblies 50 and 51 which are described below.

These are identical in construction and a description of the stop 50 will suffice. This comprises a bracket 52 mounted on the end support 42. On the top of the bracket 52 is mounted an elongated magnet 53 and just below the magnet are a pair of rods 54 and 55 carrying the springs 56 and 57. The inner ends of the springs are up against suitable stops and the outer ends abut the stops 60 and 61 slidably mounted on the rods. The stops 60 and 61 are held on the rods by lock washers not shown.

The left hand end of the carrier 43 mounts a bumper 65, which when the carriage is moved left, is adapted to engage the stops 60 and 61, and move the same back against the force of the springs until the bumper 65 contacts the magnet 53. The force of the springs is such that the magnet can hold the carrier in position.

In FIGURES 3 and 4 the pair of micro switches 70 and 71 and the pair 72 and 73 are adapted to be alternatively contacted by the arm 74 secured to the carrier 44. The function of the switches 70 and 72 is to insure that the heating source which had just previously been operating is out of the circuit, and the function of the switches 71 and 73 is to start the operation of the heating sources to be used.

When the carrier is moved to the left to the first position, the arm 74 first contacts the switch 70 and when the carrier is fully to the left, the switch 71 is contacted. When the carrier is moved to the right to the second position, the arm 74 first contacts the switch 72 and then switch 73 when the carrier is in position.

The various circuit components connected with the switches for alternatively energizing and de-energizing the heat sources is not shown as such circuitry takes conventional form.

Figure 5:
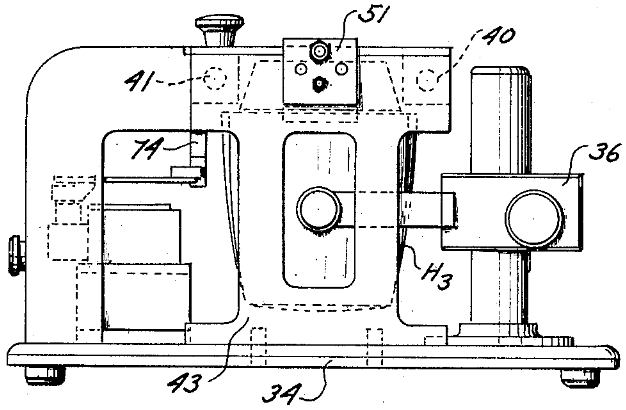
FIGURE 5 is a side view of FIGURE 3.
Figure 6:
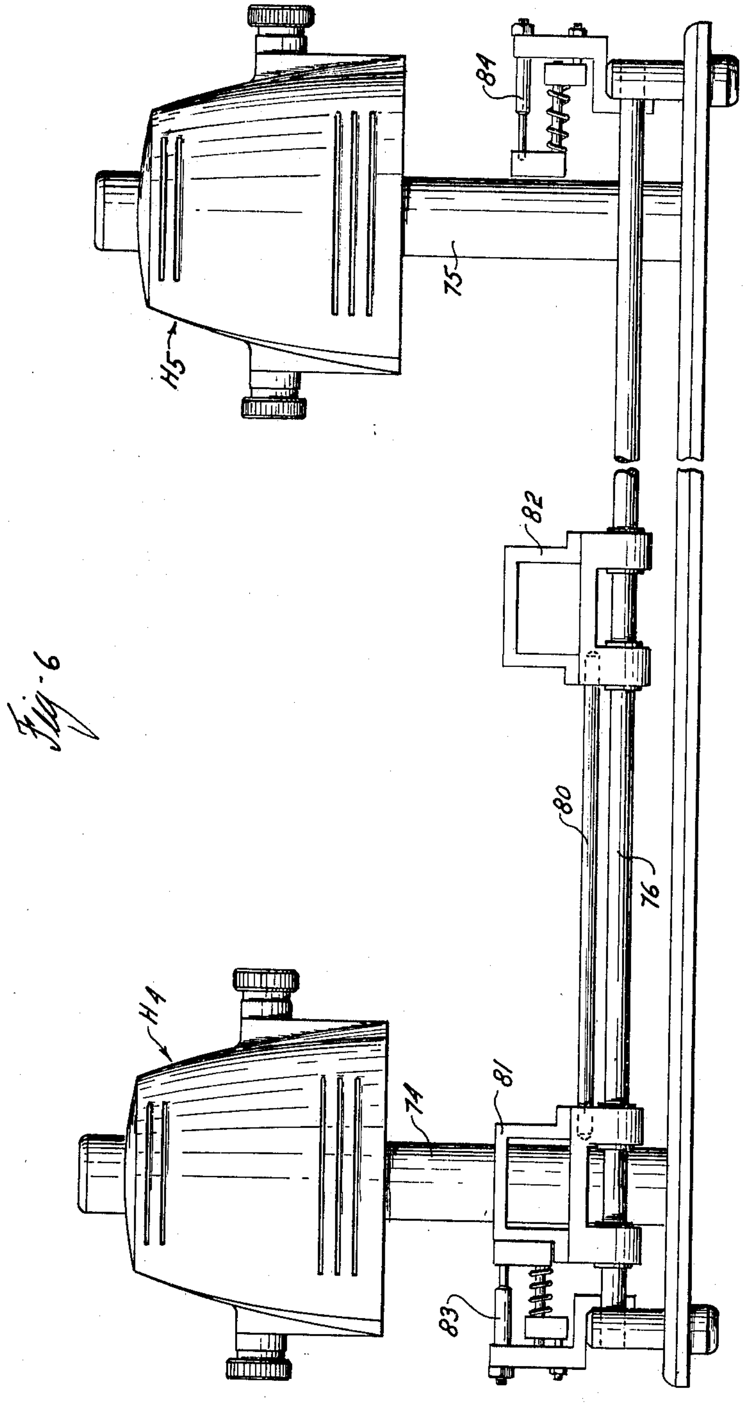
FIGURE 6 is a front elevational view of heating equipment constructed in accordance with the invention and especially adapted for high production heating.

In FIGURE 6, I have shown an embodiment of the invention which is similar to that described in connection with FIGURES 3, 4 and 5. The heating sources H–4 and H–5 are mounted on elevating assemblies so that the radiant energy is reflected downward. A support mechanism 76 slidably mounts a carrier 80 having the stations or platens 81 and 82. The support mechanism 76 provides for the carrier to be reciprocal from a first position as shown where the platen 81 is below the heat source H–4 while the platen 82 is between the two heat sources. The carrier can be moved to the right so that the platen 82 is below the heat source H–5 while the platen 81 is between the heat sources. The cushioned magnetic stops 83 and 84 define the positions of the carrier.

The arrangement of FIGURES 3, 4 and 5 is especially useful for bonding the cover and frame of a ceramic type flat pack, that is a flat pack where the frame and the cover are made of ceramic material and with the cover being bonded to the frame by melting and then solidifying a glass frit.

The arrangement of FIGURE 3, etc., permits the flat pack to be assembled with the cover down on the quartz plate with the frit facing upwardly and with the frame down against the frit. In this way when the frit is melted there is no chance that any portion of the frit will leak or otherwise get into the interior of the pack and thus contaminate the wafer and/or contacts.

Figure 9:
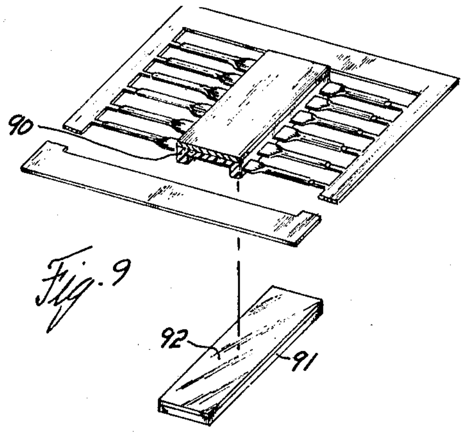
FIGURE 9 is an exploded view of a ceramic flat pack having glass frit for joining the cover to the frame.

A typical set up for bonding the cover and frame of ceramic type flat packs will be described in connection with FIGURES 9 and 10. In FIGURE 9 the frame is indicated at 90, the cover at 91 and the frit at 92.

Figure 10:
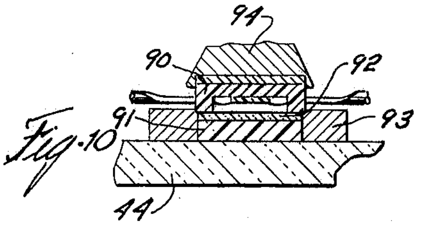
FIGURE 10 is a diagrammatic view of equipment used in joining the cover of the flat pack of FIGURE 9.

In FIGURE 10, the quartz plate 44 has a fixture or nest 93 which is adapted to hold the cover 91 with the frit 92 facing upwardly. The frame 90 is placed down on the frit and is held thereon by the hold-down means 94.

As mentioned heretofore, the top surface of the quartz plate is preferably located in the focal plane and inasmuch as the average thickness of a cover is approximately .012, it will be apparent that for all practical purposes, the frit lies in the focal plane. Thus, when the heat source is energized the radiant energy concentrates essentially on the frit so that the same is rapidly melted.

The hold-down means preferably is made of aluminum or some other good conductor of heat and is of sufficient mass so as to constitute a heat sink. With the heat sink any heat conduction through the frame 90 is siphoned off before the temperature of the frame is raised an amount sufficient to injure the wafer of the contacts.

Figure 7:
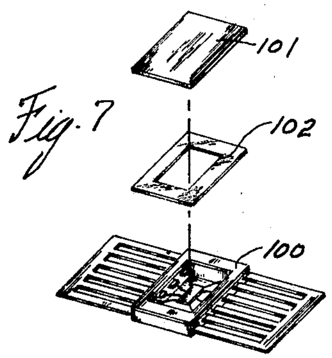
FIGURE 7 is an exploded view of a metal flat pack having a pre-form for joining the cover.
Figure 8:
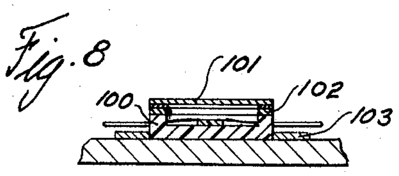
FIGURE 8 is the flat pack of FIGURE 7 in assembled condition.

The arrangements of FIGURES 1 and 6 are especially useful for metal type flat packs. Such a flat pack is illustrated in FIGURES 7 and 8 wherein the metal frame is indicated 100, the metal cover by 101 and the solder preform by 102. In FIGURE 8 the platen (80 or 81) supports a fixture or nest 103 within which is disposed the frame 100. The preform 102 is disposed on top of the frame and the cover 101 on top of the preform.

When the arrangement of FIGURE 8 it is preferable that the platen and lamp be adjusted so that the preform is substantially in the focal plane of the outer focal point rather than putting the top surface of the platen in the focal plane. The reason for the above is that the thickness of the frame may be in the order of $\frac{1}{32}''$ and such spacing will reduce the heating efficiency somewhat.

I claim:

1. In heating equipment adapted for heating a part while at the same time a previously heated part is unloaded from the equipment and a part to be subsequently heated is loaded onto the equipment:

first and second radiant energy heat sources spaced apart from one another;

a carrier having means forming a first and a second station, each station adapted for supporting a part during heating and for the loading and unloading of such part;

means mounting said carrier and providing for the carrier to move to a first position and to a second position;

in said first position the first station being located adjacent said first heat source to receive radiant energy for heating the part mounted on the station while the second station is located between the two heat sources and free from the radiant energy thereof for the unloading of a previously heated part and for the loading of a part to be heated; and in said second position the second station is located adjacent said second heat source to receive radiant energy therefrom for heating the part mounted on the station while the first station is located between the two heat sources and free from the radiant energy thereof for the unloading of the previously heated part and for the loading of a part to be heated.

2. A construction in accordance with claim 1 wherein the heat sources are located above the carrier.

3. A construction in accordance with claim 1 wherein the heat sources are located below the carrier and each station comprises a member adapted to conduct radiant energy without substantial attenuation.

4. In heating equipment adapted for heating a part while at the same time a previously heated part is unloaded from the equipment and a part to be subsequently heated is loaded onto the equipment:

first and second radiant energy heat sources spaced apart from one another, each heat source comprising a quartz envelope-tungsten filament lamp to produce radiant energy whose wave length is substantially in the infra-red band and an elliptical reflector around said lamp, the filament of the lamp being located along the focal axis of the reflector substantially at one of the focal points of the reflector;

means supporting said heat sources with each reflector oriented to reflect the radiant energy in an upward direction;

a carrier having a pair of spaced apart quartz plates, the plates being adapted for supporting a part during heating and for the loading and unloading of such part, the quartz plates forming respectively first and second stations;

means mounting said carrier for movement to a first position and to a second position;

in said first position the first station being located adjacent said first heat source to receive radiant energy therefrom for heating the part mounted on the station while the second station is located between the two heat sources and free from the radiant energy thereof for the unloading of a previously heated part and for the loading of a part to be heated; and in said second position the second station being located adjacent said first heat source to receive radiant energy therefrom for heating the part mounted on the station while the second station is located between said heat sources and free from the radiant energy thereof for the unloading of a previously heated part and for the loading of a part to be heated.

References Cited

UNITED STATES PATENTS

| | | | |
|---|---|---|---|
| 1,682,911 | 9/1928 | Jorgensen | 221—264 X |
| 1,945,196 | 1/1934 | Kelly | 219—347 X |
| 2,651,702 | 9/1953 | Burke et al. | 219—348 X |
| 3,185,343 | 5/1965 | Braendel et al. | 221—264 X |
| 3,244,859 | 4/1966 | Whiteford | 219—405 X |
| 3,304,406 | 2/1967 | King | 219—411 |
| 3,374,531 | 3/1968 | Bruce. | |

JOSEPH V. TRUHE, Primary Examiner

M. C. FLIESLER, Assistant Examiner

U.S. Cl. X.R.

219—347, 348, 349, 350, 85; 221—264